Patented July 25, 1933

1,919,372

UNITED STATES PATENT OFFICE

MAX H. KLIEFOTH, OF MADISON, WISCONSIN, ASSIGNOR TO C. F. BURGESS LABORATORIES, INC., OF MADISON, WISCONSIN, A CORPORATION OF DELAWARE

POROUS MOLDED PRODUCT AND PROCESS OF MANUFACTURING THE SAME

No Drawing.   Application filed November 11, 1931. Serial No. 574,363.

This invention relates to porous molded products made by puffing by heat a mixture of an alkali silicate and a filler. It covers an improvement in the process and products disclosed in the Weiss and Norris Patents Nos. 1,628,206 and 1,655,718.

The objects of this invention are to provide an improved process so that the puffing by heat of an alkali silicate and filler as disclosed in the above patents may be better controlled and to provide a product having an improved structure and an increased resistance to moisture. The improved structure is due to the more uniform size and distribution of the cells resulting from the intumescing operation. This uniformity results in improved strength of the product since local weak spots are eliminated.

My improved process may be applied to intumescing silicates mixed with varying amounts of filler. Usually a greater amount of filler than silicate is used although lesser amounts of filler may be used for making light weight products. As described in the above cited patents a dough-like mass of silicate and filler is subjected to the action of heat and allowed to puff in a heated mold. When used for the manufacture of wall board, the dough-like mass is rolled between two paper facings which are then inserted and held between heated platens. The mixture puffs to a porous mass which later sets into a hard rigid structure. Subsequent heat treatment is usually necessary to give the resulting product a high resistance to moisture.

I have discovered that the structure of the puffed product is improved by the addition of small quantities of borax to the intumescent mass.

When a viscous alkali silicate solution, such as sodium silicate having an $SiO_2$ to $Na_2O$ ratio of 3.25 to 1 and having a density of about 42.5° Bé. is intimately mixed with a powdered filler to form a dough having a consistency similar to that of putty and is heated, it forms a porous bread-like mass. Suitable fillers are crushed or powdered limestone, marble dust, slag, slate, dolomite, kieselguhr, kaolin, bauxite, ashes, asbestos, either fibrous or powdered, silica, tripoli, pumice, silex, phosphate rock, diatomaceous earth, whiting, talc, soapstone, etc.; or the filler may be of organic character such as wood flour, wood pulp, cork, sawdust, charcoal, wood slivers or shredded bark. Mixtures of mineral and organic fillers may be used. The ratio of filler to silicate varies with the character of the former. For instance, kieselguhr or sifted coal ashes may be only about 10% of the weight of the wet mix while powdered dolomite may be about 70% thereof. A small proportion of a soap may be included to improve the puffing properties of the mixture. In the Storey and Kliefoth Patent No. 1,742,794 there is disclosed the method of making such doughy mixtures as will result in puffed products having the maximum resistance to moisture. This is done by selecting fillers of the correct particle size and an alkali silicate of the proper viscosity and correctly proportioning these. My invention may be used to still further improve the water resistance of the products described in the Weiss-Norris and Storey-Kliefoth patents.

The doughy mass made as described is introduced into a mold, heated and puffed, or is introduced between paper liners, heated in platens and puffed as described in the Weiss and Norris patents.

Usually sodium silicate having a ratio of $SiO_2$ to $Na_2O$ of from 2.35:1 to 3.50:1 is used, those commercial silicates having a ratio of about 2.85:1 to about 3.25:1 being most suitable and available. It is possible to use sodium silicate having lower and higher $SiO_2$ to $Na_2O$ ratios than those mentioned but their properties are such that they offer more difficulties in manufacturing operations. I have found that by incorporating a small proportion of an alkali borate, preferably sodium tetraborate ($Na_2B_4O_7.10H_2O$), called borax, and preferably in the form of a powder, in the sodium silicate solution or in the mixture of sodium silicate and filler, a pronounced advantage is gained in the control of the puffing action. With the sodium silicates having the higher of the recommended $SiO_2$ to $Na_2O$ ratios only from about 10% to 25% of borax based upon the weight of sodium silicate (exclusive of water) is required for optimum results while with the silicates having the lower ratios up to 50% borax is required for best results. Smaller quantities than the minimums given may be used with decreasing effect on the product.

The bubbles or cells are smaller as a result of the incorporation of borax but the total volume of air spaces or cavities is increased. Both of these factors increase the effectiveness of the insulating properties of the material. The bubbles are more evenly distributed throughout the body of the mass and the strength of the product is increased. Without the borax the cells may be more or less irregular in size unless very careful attention is given to manufacturing operations and details. Such irregular sized holes are detrimental especially in the manufacture of wallboard since it may result in localized areas having less crushing strength than the remainder of the board.

Although these difficulties may be overcome largely by careful control of manufacturing operations and especially by the addition of a small amount of soap to the doughy mass, it is very desirable to have a mixture which will not require the use of a soap since the latter decreases the water resistance of the finished product. The borax, on the other hand, improves the structure obtained even by the most careful supervision. The borax also substantially increases the water resistance of the product, thereby simplifying the process since lower temperatures may be used to secure the desired water resistance by the heat-treating operation. In wallboard manufacture this is important since it lessens the danger of scorching the paper liners. The borax apparently fixes the alkali of the silicate so that it does not leach out as readily in water from the finished board and prevents the formation of alkali stains on the liner if the board is subject to excessive moisture.

I have found that a very satisfactory wallboard may be produced by puffing a dough-like mixture between paper liners comprising the following proportions by weight:

200–250 parts finely powdered dolomitic limestone (includes dolomite as a form of dolomitic limestone);
100–150 parts sodium silicate solution of 47° Bé. and a $SiO_2$ to $Na_2O$ ratio of 2.85:1 or an equivalent quantity of other ratio silicates;
10– 25 parts powdered borax.

For making a light weight puffed product I have found the following dough-like mixture to give satisfactory results after being puffed:

135 parts kieselguhr;
50 parts marble dust;
400 parts 47° Bé. sodium silicate solution having a 2.85:1 $SiO_2$ to $Na_2O$ ratio;
20 to 40 parts powdered borax.

In mixtures of the character involved in this invention improper proportions may cause the silicate solution to become a gel by reason of the dry filler or the borax or both abstracting water from the silicate. In the examples given gelling action for the reason given does not take place, however, and it will not in any case if sufficient water is included in the mixture. On the other hand, borax reacts with sodium silicate and under the conditions given gels it slowly. The mixture therefore must be used before the gelling is sufficient to interfere with subsequent operations, especially if borax in solution is added to a silicate solution. I have been able to hold certain solutions comprising a 2.85 to 1 ratio silicate up to 36 hours at room temperature before too much gelling occurred. In all of the examples given a sodium silicate is used having an $SiO_2$ to $Na_2O$ ratio of 2.85:1. This is done merely because such silicate is more convenient to handle due to the more suitable viscosity characteristics of its solutions. Other ratios may just as well be used as stated heretofore, due attention being given to their different properties which require corresponding changes in formula. As an example a viscous silicate having an $SiO_2$ to $Na_2O$ ratio of 4 to 1 gels quickly if more than 5% of borax is mixed therewith. The higher the ratio of $SiO_2$ to $Na_2O$ the smaller the amount of borax which may be mixed therewith, if rapid gelling is to be avoided, provided the solutions are of comparable viscosity. Although soap is omitted from the examples given, a small amount may be added if it is desirable to increase the puffing effect. A limited amount of granular material may also be incorporated in the doughy mass. In the example given, marble dust is given merely as an example of a finely powdered inert filler and any other equivalent material may be used.

While it is considered preferable to use the borate in the form of a powder it may also be used in the form of a solution. The proper adjustment should be made to compensate for the additional water which is added when a solution is used. The wet mixtures contemplated for the described intumescing operation may be made in various ways as by using powdered alkali silicates (readily soluble in water) powdered borax and a filler either wetted with sufficient water to make a dough-like mass or one which, if it is not wet at room temperatures, will become wet enough to puff when heated due to the presence of water of crystallization in the borax and water of hydration in the silicate. The mixture to be puffed will, under those conditions, not become wet until heated when the borax and silicate melt in their water of crystallization and water of hydration respectively. The claims are intended to cover such mixtures. Borax is an alkali tetraborate containing 10 molecules of water of crystallization. Some of this water may be driven off by heat prior to mixing with the silicate but throughout the claims the term borax is used broadly and is intended to cover this salt regardless of whether or not some of the water of crystallization has been driven off. However, when the percentage of borax or a tetraborate is specified, this percentage is based on the following formula: $Na_2B_4O_7.10H_2O$. Since it is not known what reaction occurs between the borax and alkali silicate during the heating operation, the resulting finished product is also specified in the claims comprising these two materials although they probably have reacted to form different and more water resistant materials, possibly insoluble complex borates, less soluble forms of alkali silicates, and other alkali borates or mixtures of these.

I claim:

1. A porous molded product comprising a mixture of a filler, alkali silicate and alkali tetraborate puffed by heat into a rigid mass, said alkali tetraborate being present in an amount less than that of said alkali silicate.

2. A porous molded product comprising a mixture of a filler, alkali silicate and borax puffed by heat into a rigid mass, said borax being present in an amount less than that of said alkali silicate.

3. A porous molded product comprising a mixture of a filler, sodium silicate and borax puffed by heat into a rigid mass, said borax being present in an amount less than that of said sodium silicate.

4. A porous molded product comprising a mixture of a filler, alkali silicate and borax puffed by heat into a rigid mass, said borax being present in an amount up to 50% of the weight of said alkali silicate.

5. A porous molded product in the form of a flat sheet with adhering facings comprising a mixture of sodium silicate, a filler and borax puffed by heat into a rigid mass between said sheets, said borax being present in an amount up to 25% of the weight of said sodium silicate.

6. A porous molded product comprising a mixture of sodium silicate, a filler and borax puffed by heat into a rigid mass, said borax being present in an amount equal to from 5% to 50% of the weight of said sodium silicate, said sodium silicate having an $SiO_2$ to $Na_2O$ ratio greater than 2.35 to 1.

7. A porous molded product in the form of a flat sheet with adherent paper facings comprising a mixture of sodium silicate, a filler and borax puffed by heat into a rigid mass between said sheets, said borax being present in an amount up to 25% of the weight of said sodium silicate and said sodium silicate having an $SiO_2$ to $Na_2O$ ratio of between substantially 2.85 to 1 and subsequentially 3.25 to 1.

8. A porous molded product comprising a mixture of 200 to 250 parts by weight of powdered dolomitic limestone, 100 to 150 parts by weight of 47° Bé. sodium silicate solution, and 10 to 25 parts by weight powdered borax puffed by heat into a rigid mass.

9. The improvement in the process of making a rigid porous mass by intumescing a wet dough-like mixture of an alkali silicate and a filler which comprises incorporating alkali tetraborate with said mixture in an amount less than that of the silicate and heating the mixture sufficiently to intumesce and harden it.

10. The improvement in the process of making a rigid porous mass by intumescing a wet dough-like mixture of an alkali silicate and a filler which comprises incorporating borax with said mixture in an amount less than that of the silicate and heating the mixture sufficiently to intumesce and harden it.

11. The improvement in the process of making a rigid porous mass by intumescing a wet dough-like mixture of sodium silicate and a filler which comprises incorporating borax with said mixture in an amount less than that of the silicate and heating the mixture sufficiently to intumesce and harden it.

12. The improvement in the process of making a rigid porous mass by intumescing a wet dough-like mixture of an alkali silicate and a filler which comprises adding the filler to an alkali silicate solution, adding borax thereto in an amount less than that of the silicate and heating the mixture sufficiently to intumesce and harden it.

13. The improvement in the process of making a rigid porous mass by intumescing a wet dough-like mixture of sodium silicate and a filler which comprises adding borax to the mixture in an amount up to 50 percent of the weight of the sodium silicate and heating the mixture sufficiently to intumesce and harden it.

14. The improvement in the process of making a rigid porous mass by intumescing a wet dough-like mixture of sodium silicate and a filler which comprises adding borax to the mixture in an amount up to 25 percent of the weight of the sodium silicate and heating the mixture sufficiently to intumesce and harden it.

15. The improvement in the process of making a rigid porous mass by intumescing a wet dough-like mixture of sodium silicate and a filler which comprises adding borax to the mixture in an amount from 5 to 25 percent of the weight of the sodium silicate and heating the mixture sufficiently to intumesce and harden it.

MAX H. KLIEFOTH.